US 11,371,428 B2

(12) United States Patent
Williams

(10) Patent No.: US 11,371,428 B2
(45) Date of Patent: Jun. 28, 2022

(54) COMBUSTION ENGINE HAVING A ROTARY COMPRESSOR-COMBUSTOR ARRAY

(71) Applicant: Gabrielle Engine Limited, Wrexham (GB)

(72) Inventor: Clive Williams, Wrexham (GB)

(73) Assignee: GABRIELLE ENGINE LIMITED, Wrexham (GB)

( * ) Notice: Subject to any disclaimer, the term of this patent is extended or adjusted under 35 U.S.C. 154(b) by 27 days.

(21) Appl. No.: 16/973,632

(22) PCT Filed: Jun. 7, 2019

(86) PCT No.: PCT/GB2019/051600
§ 371 (c)(1),
(2) Date: Dec. 9, 2020

(87) PCT Pub. No.: WO2019/239112
PCT Pub. Date: Dec. 19, 2019

(65) Prior Publication Data
US 2021/0180519 A1    Jun. 17, 2021

(30) Foreign Application Priority Data
Jun. 12, 2018   (GB) ..................... 1809612

(51) Int. Cl.
*F02C 3/16* (2006.01)
*F02C 3/08* (2006.01)
(Continued)

(52) U.S. Cl.
CPC ............. *F02C 3/16* (2013.01); *F02C 3/08* (2013.01); *F02C 7/228* (2013.01); *F02C 3/14* (2013.01); *F02C 3/165* (2013.01); *F02C 9/263* (2013.01)

(58) Field of Classification Search
CPC .... F02C 3/14; F02C 3/16; F02C 3/165; F02C 3/08; F02C 7/228; F02C 9/263; F02K 7/005
See application file for complete search history.

(56) References Cited

U.S. PATENT DOCUMENTS 3,005,311 A * 10/1961 Ross ................. F02C 3/165
60/39.35
3,321,911 A * 5/1967 Myles ................ F02C 3/165
60/39.35
(Continued)

FOREIGN PATENT DOCUMENTS

DE          904365 C     2/1954
GB          2526581 A    12/2015

*Primary Examiner* — William H Rodriguez
(74) *Attorney, Agent, or Firm* — Coats & Bennett, PLLC

(57) ABSTRACT

A combustion engine (10) comprises a radial compressor (16) in flow communication via a flow passage (22) with a compressor-combustor array (20) radially outward of the radial compressor (16), both rotatable around a central axis (12). The compressor-combustor (20) comprises an array of rotor blades (26). The walls of the blades (26) define a plurality of chambers (28, 30). Each chamber (28, 30) has a flow inlet (32) to receive fluid from the radial compressor (16), and a flow outlet to exhaust fluid radially outwards from the compressor-combustor (20). The plurality of chambers (28, 30) comprises a first pilot combustion chamber (28a) and a second pilot combustion chamber (28b). The first pilot combustion chamber (28a) is provided with a first fuel injector (40a), and the second pilot combustion chamber (28b) is provided with a second fuel injector (40a). The first fuel injector (40a) is in flow communication with a first fuel reservoir (70a), and the second fuel injector (40b) is in flow communication with a second fuel reservoir (70b). The first fuel reservoir (70a) and the second fuel reservoir (70b) are each in fluid communication with a flow regulator (100), (Continued)

the flow regulator (100, 200, 300) operable to vary fuel flow delivery rate to the first reservoir (70a) and vary fuel flow delivery rate to the second reservoir (70b). The differential regulation of fuel flow between pilot combustion chambers results in different levels of thrust being generated downstream of the combustion chambers. In this way the engine is operable to produce vectored thrust.

15 Claims, 9 Drawing Sheets

(51) Int. Cl.
*F02C 7/228* (2006.01)
*F02C 9/26* (2006.01)
*F02C 3/14* (2006.01)

(56) References Cited

U.S. PATENT DOCUMENTS

| | | | |
|---|---|---|---|
| 3,626,694 A * | 12/1971 | Holste | F01D 1/06 |
| | | | 60/793 |
| 3,727,401 A * | 4/1973 | Fincher | F02C 3/165 |
| | | | 60/39.35 |
| 5,884,483 A | 3/1999 | Munro | |
| 2003/0192304 A1 * | 10/2003 | Paul | F02C 3/045 |
| | | | 60/262 |
| 2004/0154309 A1 * | 8/2004 | Bernard | F04D 29/442 |
| | | | 60/805 |
| 2013/0192231 A1 * | 8/2013 | Buchler | F01D 1/04 |
| | | | 60/722 |
| 2017/0058767 A1 * | 3/2017 | Williams | F02C 3/14 |

* cited by examiner

COMBUSTION ENGINE HAVING A ROTARY COMPRESSOR-COMBUSTOR ARRAY

BACKGROUND

Internal combustion engines, and in particular gas turbine engines, are well known and can take many different forms.

Gas turbine engines comprise a flow path defined by a compressor, combustor and a turbine. Gas accelerated by a combustion process passes through the turbine, and the turbine powers the compressor via a shaft, and hence the compressor is rotated to deliver a flow of air to the combustor and thus perpetuate a combustion cycle.

As shown in FIG. 1, an engine 1 may produce thrust by ejecting the accelerated gas 2. The resultant velocity profile 3 of the ejected gas may be largely uniform and/or travel in a direction centred on a central axis of the engine. GB 2526581 (GABRIELLE ENGINE LIMITED) describes an alternative example of the related art.

If thrust vectoring of exhaust gas to provide directional control is required, conventional means exist to achieve this, for example providing an adjustable exhaust nozzle for directing the exhaust gas in different directions.

The number of components required to do this, including housings, actuators, control systems and other ancillary equipment, mean that the resultant construction of such devices is complex and heavy. Operation of such arrangements may increase vibration, engine complexity, unreliability together with greater cost and an interruption to the flow path, and which also degrade engine performance.

Hence a combustion engine which is capable of producing vectored thrust, which comprises a fixed exhaust nozzle geometry, and hence fewer parts and lower weight, than examples of the related art, is highly desirable.

SUMMARY

According to the present invention there is provided an apparatus as set forth in the appended claims. Other features of the invention will be apparent from the dependent claims, and the description which follows.

Accordingly there may be provided a combustion engine (10) comprising a compressor-combustor array (20) radially outward of a radial compressor (16). Both the radial compressor (16) and compressor-combustor array (20) may be co-axial with, and rotatable around, a central axis (12), wherein the compressor-combustor array (20) comprises an array of rotor blades (26) comprising walls, wherein the walls of the blades (26) define a plurality of chambers (28,30). The plurality of chambers (28, 30) may comprise: a first pilot combustion chamber (28a) and a second pilot combustion chamber (28b), and at least one of the plurality of chambers (30) being provided as a compression flow path (30). The first pilot combustion chamber (28a) may be provided with a first fuel injector (40a), and the second pilot combustion chamber (28b) may be provided with a second fuel injector (40b), wherein the first fuel injector (40a) is in flow communication with a first fuel reservoir (70a), and the second fuel injector (40b) is in flow communication with a second fuel reservoir (70b). The first fuel reservoir (70a) and the second fuel reservoir (70b) may each be in fluid communication with a flow regulator (100), the flow regulator (100, 200, 300) operable to vary fuel flow delivery rate to the first reservoir (70a) and vary fuel flow delivery rate to the second reservoir (70b).

The plurality of chambers (28, 30) may comprise additional pilot combustion chambers (28c, 28d), at least one of the additional pilot combustion chambers (28c, 28d) being in flow communication with the first fuel reservoir (70a); and at least one of the additional pilot combustion chambers (28c, 28d) being in flow communication with the second fuel reservoir (70b).

The flow regulator (100, 200) may comprise a first flow control valve (102) in flow communication with the first fluid reservoir (70a), and a second flow control valve (104) in flow communication with the second fluid reservoir (70b), wherein the first flow control valve (102) and second flow control valve (104) are operable to regulate fuel flow independently of one another.

The combustion engine (10) may comprise additional fuel reservoirs (70), the plurality of chambers (28, 30) comprises additional pilot combustion chambers (28c, 28d) each pilot combustion chamber being in flow communication with only one fuel reservoir (70); wherein each fuel reservoir (70) is in fluid communication with the flow regulator (100, 200, 300).

The flow regulator (100, 200) may comprise a plurality of flow control valves (106) each of the fuel reservoirs (70) is in fluid communication with a different flow control valve (102, 104, 106, 108) wherein each flow control valve (102, 104, 106, 108) is operable to regulate fuel flow independently of one another.

Each of the fluid reservoirs (70a, 70b) may be coupled to, and rotatable with, its respective pilot combustion chamber (28a, 28b), around the central axis (12).

The pilot combustion chambers (28) may be divided into groups extending around sectors of the compressor-combustor array (20). The fuel injectors (40) of each group of pilot combustion chambers (28) may be in flow communication with a different fluid reservoir (70).

The pilot combustion chambers (28) may be divided into: a first group extending around a first sector of the compressor-combustor array (20) and a second group extending around a second sector of the compressor-combustor array (20). The first fluid reservoir (70a) may be in flow communication only with fuel injectors (40) of pilot combustion chambers (28) in the first group. The second fluid reservoir (70b) may be in flow communication only with fuel injectors pilot combustion chambers (28) in the second group.

The first sector and second sector may extend around different halves of the compressor-combustor array (20).

The first flow control valve (102) and second flow control valve (104) may be operable to regulate fuel flow independently of one another in response to a signal from a control system.

The flow regulator (100) may comprise an actuator, and each flow control valve (102,104,106,108) is operable to be open and closed by the actuator.

The actuator may comprise control rods (84) which extend from a swash plate (80); each control valve (102, 104, 106, 108) coupled to a different control rod (84); such that movement of the swash plate (80) adjusts the each control valve (102, 104, 106, 108) to a different extent thereby operable to control fuel flow delivery rate to each of the fuel reservoirs (70).

The flow control valves (102, 104, 106, 108) may each be provided as an aperture (110) openable and closable by a common restrictor plate (112). The restrictor plate (112) may comprise a first cam plate (114) provided around, and rotatable relative to, a second cam plate (116). The first cam plate (114) and second cam plate (116) may be concentrically rotatably mounted. The flow regulator (200) may comprise an actuator coupled to the first cam plate (114) and the second cam plate (116) so that the first cam plate (114)

and the second cam plate (116) are independently rotatable to thereby move the restrictor plate (112) relative to each of the valve apertures (110) such that movement of the restrictor plate (112) adjusts the each control valve (102, 104, 106, 108) to a different extent, and is thereby being operable to control fuel flow delivery rate to each of the fuel reservoirs (70).

The flow regulator (300) may comprise: a fuel vaporiser (310) which is in flow communication with a fuel vapour chamber (312) via a first electrode (316) operable to provide a charge of a first polarity to fuel vapour passing therethrough, each of the fuel reservoirs (70a, 70b) being in flow communication with the fuel vapour chamber (312) via respective flow ports (318) which extend from the fuel vapour chamber (312); the flow ports each being provided in a respective second electrode plate (320) which extends around each port (318), each of the second electrode plates (320) operable to provide a charge of a second polarity opposite to the first polarity; each of the second electrode plates (320) operable to be controlled independently to bias the flow to fuel vapour through their respective ports (318).

A main combustion chamber (60) may be provided radially outwards of the compressor-combustor array (20), and is in flow communication with the or each compressor-combustor array (20) chambers (28,30); and the main combustion chamber (60) has a plurality of outlets (62), each outlet being in flow communication with a plurality of exhaust ducts (64).

Thus there is provided a thrust vectoring combustion engine which encompasses differential regulation of fuel flow across sectors of the engine such that the overall direction of thrust produced by the engine may be vectored. The way in which thrust vectoring is achieved is thus of relatively simple design and comprises relatively few moving parts. It is hence easier and cheaper to manufacture than a conventional thrust vectored turbo machine, and also inherently more robust and overall volumetrically smaller than turbo machinery having equivalent power outputs.

This combustion engine of the present disclosure may be of particular interest as a means of achieving stable hover or vectored flight.

BRIEF DESCRIPTION OF THE DRAWINGS

Examples of the present disclosure will now be described with reference to the accompanying drawings, in which.

DETAILED DESCRIPTION

Figure 2:
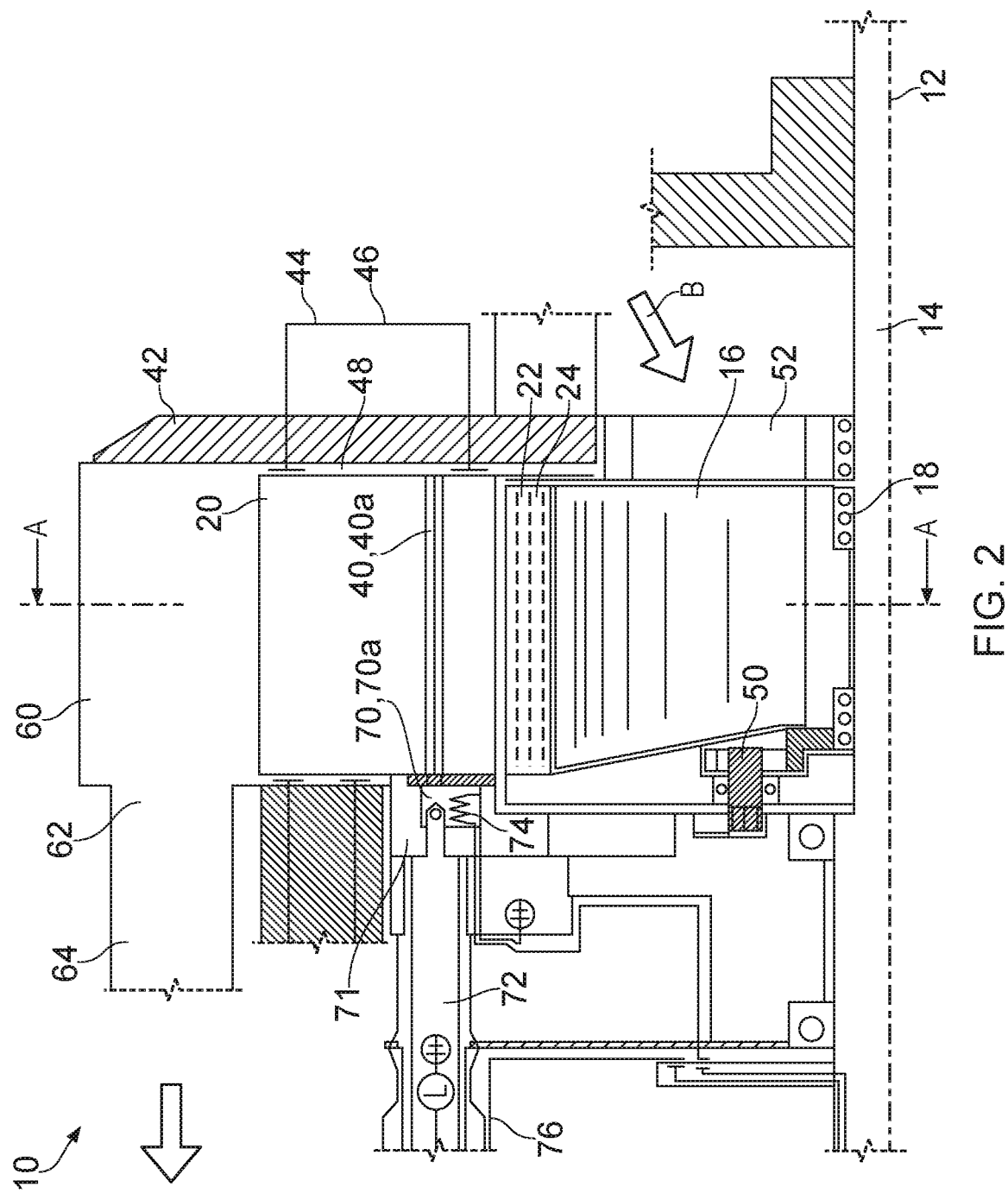
FIG. 2 shows a cross-sectional view of the combustion engine according to the present disclosure.
Figure 3:
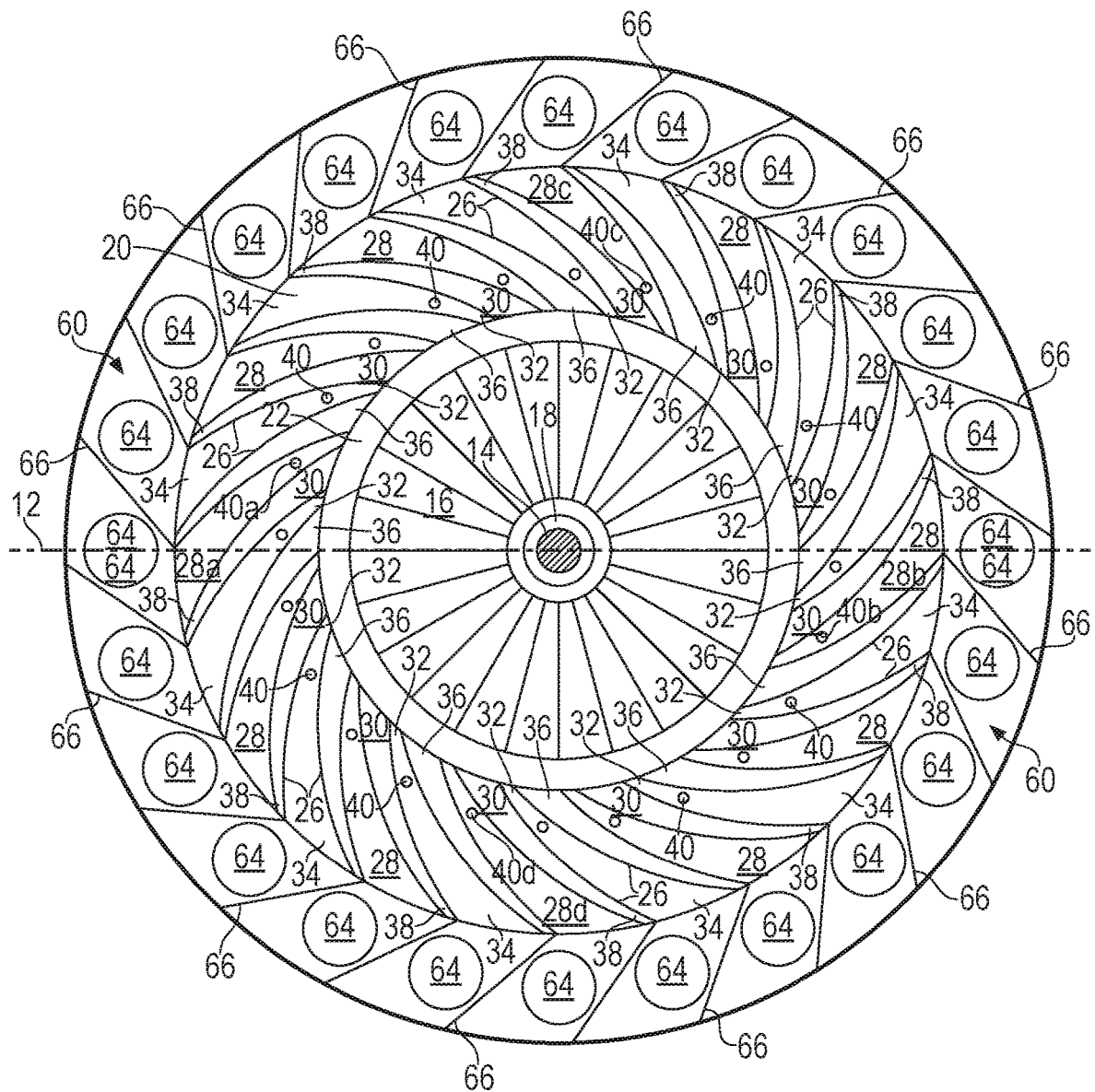
FIG. 3 shows a cross-sectional view through line A-A in FIG. 2.

FIG. 2 shows a cross-sectional view of a combustion engine 10 according to the present disclosure. FIG. 3 shows a cross-sectional view through line A-A shown in FIG. 2. The device is presented schematically, and it will be appreciated that technical details have been omitted for the sake of clarity, or where such are well known in the art.

The features shown in FIGS. 2, 3 are symmetrical about a central rotational axis 12. A non-rotatable (i.e. fixed or static) shaft 14 is centred on, and hence co-axial with, the central axis 12. The shaft 14 carries a radial compressor 16. The radial (or "first stage") compressor 16 is rotatably supported on the shaft 14 by a bearing means 18.

It will be appreciated the term "radial compressor" may have a specific meaning in the art. In the present disclosure the term "radial compressor" is intended to encompass any compressor which compresses a fluid as the fluid is directed outwards from a central rotational axis. Fluid may be a liquid or gas, or mixture of both.

The bearing means 18 may comprise rollers, balls or may be provided as a magnetic bearing.

An annular compressor-combustor 20 is provided radially outward of the radial compressor 16. The compressor-combustor 20 may be provided directly radially outwards of the radial compressor 16 (as shown in the figures). Alternatively, the compressor-combustor 20 may be provided radially outwards and axially offset from the radial compressor 16.

The compressor-combustor array 20 is coaxial with, and rotatable around, the shaft 14, and hence the central axis 12. The radial compressor 16 is in flow communication with the compressor-combustor array 20 via a flow passage 22.

The radial compressor 16 and the compressor-combustor 20 are rotatably mounted such that they are rotatable relative to one another. That is to say, the radial compressor 16 and the compressor-combustor 20 may rotate at different speeds to one another around the central axis 12. The radial compressor 16 and the compressor-combustor 20 may additionally, or alternatively, rotate in different directions to one another around the central axis 12. The radial compressor 16 is mechanically linked via a gearing mechanism 50 to the compressor-combustor array 20 such that rotation of the compressor-combustor 20 drives the radial compressor 16.

As shown in FIG. 2 (but omitted from FIG. 3 for clarity) the flow passage 22 comprises an array of flow turning vanes. Alternatively, no flow turning vanes are provided in the flow passage 22. Alternatively, vanes are provided to direct, but not turn, fluid passing through the flow passage 22.

The compressor-combustor array 20 comprises an array of rotor blades 26. The walls of the rotor blades 26 define a plurality of chambers 28, 30. Some of the chambers are configured as pilot combustion zone chambers 28, and the other chambers are configured and provided as ("second stage") compression flow path chambers 30. Each pilot combustion zone chamber 28 has a flow inlet 32 configured to receive fluid from the inner compressor 16, and a flow outlet 34 to exhaust fluid, which is on the radially outward side of the pilot combustion zone chamber 28. Each of the compressor flow path chambers 30 have a flow inlet 36 to receive fluid from the inner compressor 16, and a flow outlet 38 to exhaust fluid radially outwards from the compression flow path chamber 30. That is to say, each chamber 28, 30 has a flow inlet to receive fluid from the inner compressor 16, and a flow outlet to exhaust fluid radially outwards from the compressor-combustor 20.

The pilot combustion zone chambers 28 are provided between the compression chambers 30. That is to say, moving around the circumference of the compressor-combustor array 20, the pilot combustion chambers 28 and compression chambers 30 are provided alternatively around the array, such that each pilot zone 30 is flanked on either side by a compression chamber 30, and each compression chamber 30 is flanked on both sides by a pilot combustion zone chamber 28. Put another way, each pilot zone combustion chamber 28 is spaced apart from the next pilot zone combustion chamber 28 by a compression chamber 30. Likewise each compression chamber 30 is spaced apart from the next compression chamber 30 by a pilot combustion zone chamber 28.

Alternatively, there may be provided a different pattern of pilot zone combustion chambers 28 and compression chambers 30 which are spaced and alternated in a different pattern to that described above. Essentially however, there should be provided a number of pilot combustion zone chambers 28 around the circumference of the compressor-combustor array 20 in addition to a number of fluid flow passages 30 between them. The flow paths 30 may be provided as compression chambers 30 as described above and shown in the Figures. Alternatively the flow paths between pilot combustion zone chambers 28 may be configured to provide fluid flow expansion. Alternatively the flow paths between pilot combustion zone chambers 28 may provide a flow path only, i.e. without significant compression or expansion between the inner compressor 16 and the outlet from the compressor-combustor 20.

As well as providing a source of fluid for complete combustion (discussed later) the flow through the compression chambers 30 also acts to cool the rotor blades 26 by removing heat absorbed by the vanes 26 as a result of the combustion in the pilot zone combustion chambers 28.

The walls of the or each compression chamber 30 may converge between the flow inlet 36 and the flow outlet 38. That is to say, the flow inlet 36 to the compression chamber 30 has a greater effective flow area than the corresponding flow outlet 38.

In alternative examples, the walls of the or each chambers 30 may diverge or be substantially parallel between the flow inlet 36 and the flow outlet 38, in which case they provide flow passages rather than compression flow paths.

The walls of the or each pilot combustion zone chamber 28 may diverge between its flow inlet 32 and its flow outlet 34, such that the flow inlet 32 has a smaller effective flow area than it's flow outlet 34.

The radially inner compressor 16 comprises a fluid inlet 52 towards its radially inner end. Upstream of this is a flow path to provide a source of fluid (i.e. air) to the compressor 16.

A main combustion chamber 60 is provided radially outwards of the compressor-combustor array 20 and is in fluid communication, that is to say flow communication, with the or each compressor-combustor chambers 28. That is to say, the flow outlet 34 from the compressor-combustor chambers 28 exhaust directly into the main combustor 60. The main combustion chamber 60 has an outlet 62, the outlet 62 being in flow communication with an exhaust duct 64. The main combustor 60 defines a flow path at an angle to the radial flow direction defined by the radial compressor 16 and compressor-combustor 20.

The main combustor 60 defines a flow path substantially perpendicular to the radial flow direction defined by the inner compressor 16 and the compressor-combustor 20.

The main combustor 60 may comprise vanes 66 which define a flow path between the exit of the compressor-combustor 20 to the exhaust duct 64, as shown in FIG. 2. The exhaust duct 64 may comprise a series of ducts arranged around the circumference of the main combustor chamber 60, each duct 64 being provided as a circular tube which extends away from the combustion chamber 60. In other examples the ducts 64 may be provided with polyhedral cross sections. The walls of the ducts 64 may be contiguous or may be spaced apart.

The vanes 66 may be shaped and configured such that they direct gas travelling from the exit from the compressor-combustor 20 to each of the exhaust ducts 64. That is to say, the vanes 66 define flow paths which lead to the entrance to the exhaust duct 64.

The pilot combustion chambers 28 are provided with a fuel injector 40. In the example shown in FIGS. 2, 3, the fuel injector 40 is provided towards the inlet end 32 of the pilot combustion chamber 28. The fuel injector 40 extends from one wall of the pilot combustion zone chamber 28 at least part way across to an opposing wall of the pilot combustion zone chamber 28. In the example shown, the fuel injector 40 extends all of the way from one wall of the pilot zone combustion chamber 28 to an opposing wall of the pilot zone combustion chamber 28. In the example shown, the fuel injector 40 comprises a hollow tube with at least one aperture located at a position spaced apart from the wall of the pilot combustion chambers 28 to deliver fuel from inside the tube to the pilot combustion zone chamber 28.

The fuel injectors 40 control the amount of fuel which may be delivered to the pilot combustion chamber 28. In some examples, variation in mass of the fuel supplied per unit of time may be achieved by pressure and/or pulse metering.

A housing 42 is provided around the compressor-combustor 20 with passages 44 being provided in walls of the housing 42 for the delivery of fluid from a source 46 of compressed fluid to a clearance gap 48 provided between the compressor-combustor 20 and the housing 42, to thereby provide an air bearing. Provision of an air bearing is only one possible solution to support, alignment and cooling needs of a device of the present disclosure, and any suitable bearing and cooling means may be provided as an alternative.

The fuel injector 40 opens at one end into a fluid reservoir 70 adjacent a wall of the housing 42.

As shown in FIG. 2, a fuel delivery conduit 72 delivers fuel to the chamber/reservoir 70. The fluid reservoir 70 may be operable/configured as a preheat chamber (for example being provided with or in contact with a heat source). For example a glow plug 74 may be provided in the chamber/reservoir 70 to pre heat fuel in the chamber 70 prior to being delivered to the fuel injector 40.

Also as shown in FIG. 2, fuel lines 76 are provided to receive fuel from a fuel source (not shown), and are in flow communication with the conduit 72. That is to say the fuel lines 76 extends from a fuel source to the fuel delivery conduit to thereby deliver fuel to the chamber/reservoir 70. The fuel source (not shown) may be non-rotatable (i.e. static with respect to the rotating compressor-combustor array 20). The fuel delivery conduit 72 is rotatable with the compressor-combustor 20. At least a portion of the fuel lines 76 may also be rotatable with the compressor-combustor 20.

Figure 5:
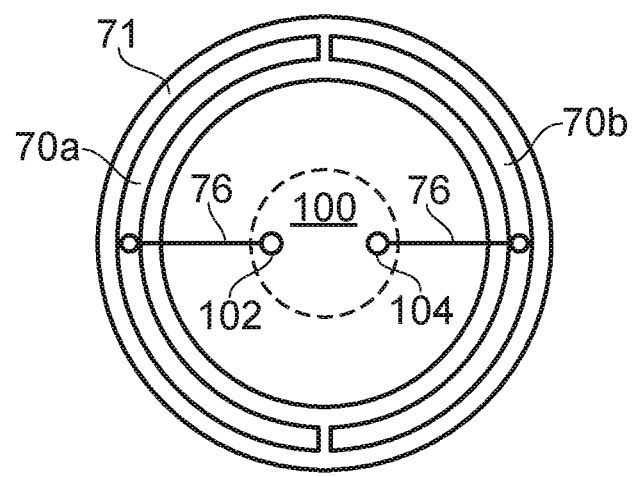
FIGS. 5, 6, 7 show sectional views of different examples of fuel flow reservoirs provided as part of the combustion engine of FIGS. 2 to 4.
Figure 6:
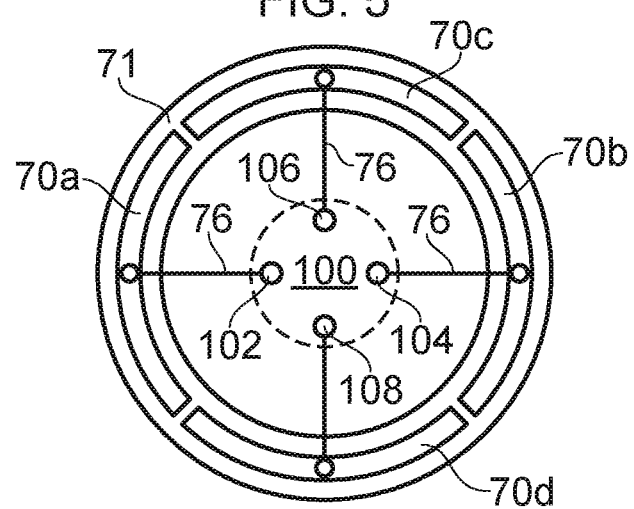
Figure 7:
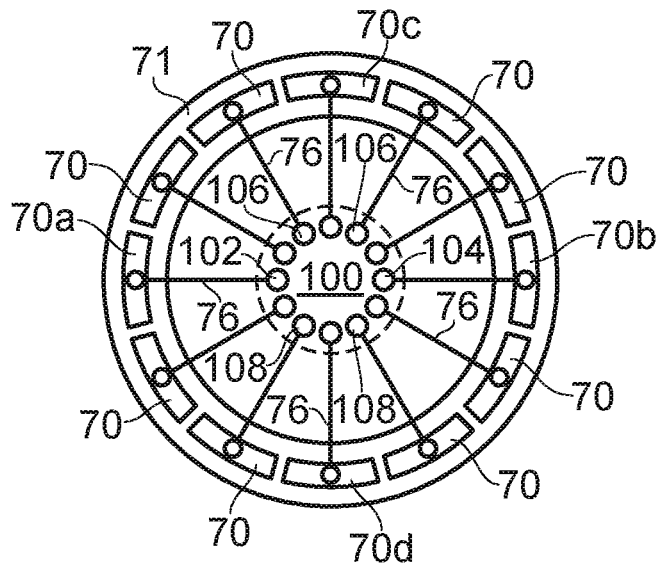

As shown in FIG. 3, the plurality of pilot combustion chambers 28 comprises a first pilot combustion chamber 28a and a second pilot combustion chamber 28b, each of which are configured as a pilot combustion zone. Hence, in line with description above, the first pilot combustion chamber 28a is provided with a first fuel injector 40a, and the second pilot combustion chamber 28b is provided with a second fuel injector 40b. As shown in FIG. 2, the first fuel injector 40a is in flow communication with (i.e. opens at one end into) a first fuel reservoir 70a for the delivery of fuel to the fuel injector 40). Likewise (but not shown), the second fuel injector 40b is in flow communication with a second fuel reservoir 70b. As shown in FIGS. 5, 6, 7, the first fluid reservoir 70a is fluidly isolated from the second fluid reservoir 70b. Also as shown in FIGS. 5, 6, 7, the first fuel reservoir 70a and the second fuel reservoir 70b are each in fluid communication with the fuel source via a flow regulator 100.

As shown in FIG. 3, the plurality of pilot combustion chambers 28 may also comprise additional pilot combustion chambers 28c, 28d, as well as other additional pilot combustion chambers 28.

In FIG. 2 reservoirs 70 are provided in a ring 71. That is to say the reservoirs 70 may be provided as a cavity or passage or other volume defined in the ring 71. Examples of how the chamber 70 may be defined are shown in FIGS. 5, 6, 7.

The chambers/reservoirs 70a, 70b may extend circumferentially around the ring 71. That is to say the first fuel reservoir 70a extends around part of the extent of the ring 71, and the second fuel reservoir extends around a different extent of the ring 71. Put another way, the first fuel reservoir 70a is spaced apart from the second fuel reservoir 70b, each provided in a different sector of the ring 71.

The example ring 71 shown in FIG. 5 comprises a first fuel reservoir 70a and a second fuel reservoir 70b, each of which extend around half of the ring 71.

The example ring 71 shown in FIG. 6 comprises a first fuel reservoir 70a, a second fuel reservoir 70b, a third fuel reservoir 70c and fourth fuel reservoir 70d, each of which extend around a quarter of the ring 71. As shown, the first fuel reservoir 70 a may be provided at a 9 o'clock position, the second fuel reservoir 70b may be provided at a 3 o'clock position, the third fuel reservoir 70c may be provided at the 12 o'clock position, and the fourth fuel reservoir 70d may be provided at the 6 o'clock position.

The example ring 71 shown in FIG. 7 comprises twelve fuel reservoirs 70. For consistency with FIG. 6, the first, second, third and fourth fuel reservoirs 70a, 70b, 70c, 70d are shown in the same positions as in FIG. 6, although additional fuel reservoirs are provided between each of the first, second, third and fourth fuel reservoirs 70a, 70b, 70c, 70d.

In each of the examples of FIGS. 5, 6, 7 the fuel reservoirs are spaced around the ring 71 so as to provide a series of fuel reservoirs around the entire ring 71. The reservoirs 70 are fluidly isolated from one another. That is to say there is no flow communication between the reservoirs 70 in the ring 71.

At least one fuel delivery conduit 72 is in flow communication with each reservoir 70. That is to say, multiple fuel delivery conduits 72 may supply each reservoir 70. As shown in the examples of FIGS. 5, 6, 7, each fuel delivery conduit 72 and reservoir 70 may receive fuel from a single fuel line 76. Alternatively groups of fuel delivery conduits 70 may be supplied in parallel from a single fuel line 76 which splits to feed the group (not shown).

In an example in which the ring 71 is provided as shown in FIG. 5, the pilot combustion chambers 28a, 28c are in flow communication with the first fuel reservoir 70a, and pilot combustion chambers 28b, 28d are in flow communication with the second fuel reservoir 70b. That is to say, the pilot combustion chambers 28a, 28c are both in flow communication with the first fluid reservoir 70a, and the pilot combustion chambers 28b, 28d are both in flow communication with the second fluid reservoir 70b. Put another way, at least one of the additional pilot combustion chambers 28c, 28d is in flow communication with the first fuel reservoir 70a, and at least a different one of the additional pilot combustion chambers 28c, 28d is in flow communication with the second fuel reservoir 70b, wherein each fuel reservoir 70a, 70b is in fluid communication with the same or different fuel source via the flow regulator 100. Hence in this example the pilot combustion chambers 28 are divided into a first group extending around a first sector of the compressor-combustor array 20 and a second group extending around a second sector of the compressor-combustor array 20, and the first fluid reservoir 70a is in flow communication only with fuel injectors 28 in the first group and the second fluid reservoir 70b is in flow communication only with fuel injectors 28 in the second group.

The first sector and second sector may extend around different halves of the compressor-combustor array 20 to correspond to the extent of the flow reservoirs 70 as shown in FIG. 5.

In an example in which the ring 71 is provided as shown in FIG. 6, the fuel reservoirs 70a, 70b, 70c, 70d are each in flow communication with different pilot combustion chambers 28. However, each of the fuel reservoirs 70a, 70b, 70c, 70d may also be in flow communication with other pilot combustion chambers 28. Hence two or more adjacent pilot combustion chambers 28 may be in flow communication with the same fuel flow reservoir 70, wherein each fuel reservoir 70 is in fluid communication with the same or different fuel source via the flow regulator.

Hence in this example the pilot combustion chambers 28 are divided into groups extending around four sectors of the compressor-combustor array 20, each group of fuel injectors 40 being in flow communication with a different fluid reservoir 70.

That is to say, in the example of FIG. 6, the four sectors extend around different regions of the compressor-combustor array 20 to correspond to the extent of the flow reservoirs 70 as shown in FIG. 6.

In an example in which the ring 71 is provided as shown in FIG. 7, the pilot combustion chambers 28 are each in flow communication with a different fuel reservoir 70. That is to say, each pilot combustion chamber is in flow communication with only one fuel reservoir 70, wherein each fuel reservoir 70 is in fluid communication with the same or different fuel source via the flow regulator 100. Hence in this example the pilot combustion chambers 28 extends around twelve sectors of the compressor-combustor array 20, each fuel injector 40 (or groups of fuel injectors 40) being in flow communication with a different fluid reservoir 70a, 70b.

That is to say, in the example of FIG. 7, the twelve sectors extend around different regions of the compressor-combustor array 20 to correspond to the extent of the flow reservoirs 70 as shown in FIG. 7.

Although two, four and twelve reservoirs 70 are shown in FIGS. 5, 6, 7, these are by way of example only, and other numbers of reservoirs may alternatively be provided. Each of the fluid reservoirs 70 is coupled (i.e. fixed) to, and rotatable with, its respective pilot combustion chamber 28 around the central axis 12.

Examples of different flow regulators are described below and shown in FIGS. 5 to 14.

In each case the flow regulator is operable to vary fuel flow delivery rate to different fuel reservoirs. Hence, in operation, the fuel flow delivery rate to one fuel reservoir 70 may be less than, the same as or more than the fuel flow delivery rate to any of the other fuel reservoirs 70.

Hence in the example of FIG. 5, the flow regulator is operable to vary fuel flow delivery rate to the first reservoir 70a and vary fuel flow delivery rate to the second reservoir 70b. Hence, in operation, the fuel flow delivery rate to one of the first fuel reservoir 70a or second fuel reservoir 70b may be less than, the same as or more than the fuel flow delivery rate in the other of the first fuel reservoir 70a or second fuel reservoir 70b.

Likewise in examples in which more than two fuel reservoirs 70a, 70b are provided (e.g. FIGS. 6, 7) the flow regulator is operable to vary the fuel flow delivery rate to each of the fuel reservoirs so that the fuel flow delivery rate to one of the fuel reservoirs may be less than, the same as or more than the fuel flow delivery rate in another of the fuel reservoirs. Also fuel flow delivery rate to each of the fuel reservoirs may be varied relative to all of the other fuel reservoirs so that the fuel flow delivery rate in each of the fuel reservoirs may be less than, the same as or more than the fuel flow delivery rate in any of the other fuel reservoirs. Put another way fuel flow delivery rate to each of the fuel reservoirs may controlled such that the same fuel flow delivery rate is delivered to some or all of the fuel reservoirs, or controlled such that fuel flow delivery rate to at least one of the fuel reservoirs is differed to fuel flow delivery rate to the other fuel reservoirs.

In one example as shown in FIG. 5, the flow regulator 100 comprises a first flow control valve 102 in flow communication with the first fluid reservoir 70a, and a second flow control valve 104 in flow communication with the second fluid reservoir 70b, wherein the first flow control valve 102 and second flow control valve 104 are operable to regulate fuel flow independently of one another. FIG. 6 shows a similar arrangement with additional flow control valves 106, 108 in flow communication with the third reservoir 70c and fourth reservoir 70d respectively. FIG. 7 shows a similar arrangement with additional flow control valves in flow communication with th additional flow reservoirs 70.

Hence in these examples the flow regulator 100 comprises a plurality of flow control valves (for example valves 102, 104, 106, 108) each of the fuel reservoirs 70 being in fluid communication with a different flow control valve, and each flow control valve is operable to regulate fuel flow independently of one another.

The first flow control valve 102 and second flow control valve 104 are operable to regulate fuel flow independently of one another in response to a signal from a control system (not shown).

Valves may powered by a direct link to a power source, and/or by electromagnetic, radio or induction means.

In another example the flow regulator comprises an actuator, and each flow control valve is operable to be open and closed (as well as partially opened and partially closed to provide variable flow restriction) by the actuator.

Figure 8:
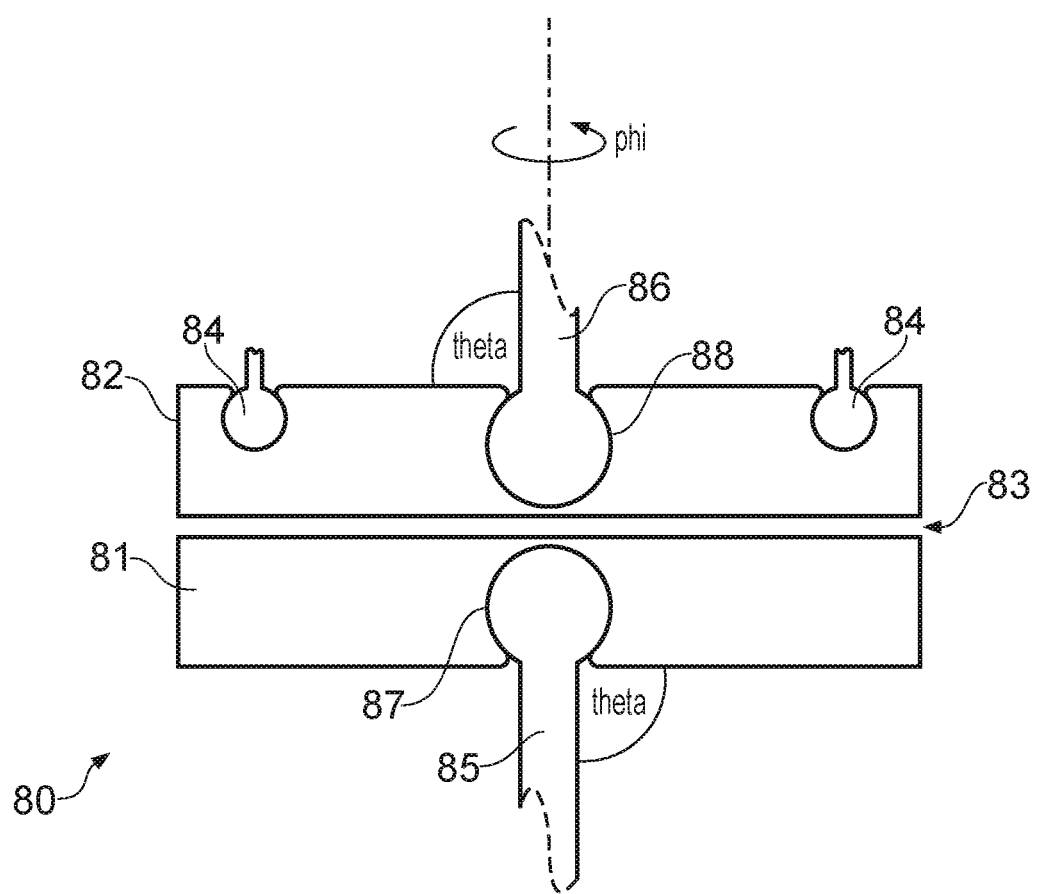
FIG. 8 shows an example of part of a flow regulator provided as part of the combustion engine of FIGS. 2 to 4.

As shown in FIG. 8, the actuator may comprise control rods 84 which extend from a swash plate 80.

A swashplate 80 is an exemplary means for supplying each line 76 from the compressor combustor array 20 with an adjustable fuel delivery rate which is independent of the rotation of the lines 76 and the compressor combustor array 20. That is to say, the swashplate 80 may be employed to ensure each line 76 receives fuel at a fuel delivery rate which is dependent on the configuration of the swashplate 80 and does not depend on the rotation of the compressor combustor array 80.

As shown in FIG. 8, the swashplate 80 comprises a stationary disk 81 and a rotatable disk 82, which are rotatable relative to each other. The rotatable disk 82 is configured to rotate with the compressor combustor array 20 relative to the stationary disk 81. The disks 81, 82 are separated by suitable means 83 to optimise relative rotation by ensuring low friction. These suitable means 83 may include a lubricating medium, such as oil or pressurised air, or electrostatic means.

The plurality of control rods 84 extend from the rotatable disk 82 and mechanically link the swashplate 80 to the control valves 102, 104, 106, 108 of the compressor combustor array 20, to thereby adjust the control valves and thus adjust the fuel delivery rate. In an alternative example, electromechanical means, such as pressure transducers extending from the swashplate 80, may be used to generate a signal, wherein the control valves are operable to regulate flow in response to the signal.

The swashplate 80 comprises a pair of supporting rods 85, 86. The first supporting rod 85 meets the stationary disk 81 at a first central universal joint 87 located along the central axis 12, extends along the central axis and is joined, for example, to the housing 42 provided about the compressor combustor array 20. Similarly, the second supporting rod 86 meets the rotatable disk 82 at a second central universal joint 88 located along the central axis 12, extends along the central axis and is joined to the compressor combustor array 20.

The stationary disk 81 is adjustable between a first position and a second position to cause the rotatable disk 82 to change between a corresponding first position and second position. In turn, this causes the control rods to move been a first position and second position. For example, tilting the stationary disk by changing an angle theta relative to the supporting rod 85 also causes the rotatable disk to tilt by theta and, in operation, to rotate in a rotational plane which is inclined relative to the rotational axis. The rotational plane may described by the angle theta and an angle phi which correspond to a polar angle and an azimuthal angle. The spacing between the rotatable disk 82 and the compressor combustor array 20 therefore depends on the orientation of the stationary disk 81 relative to the compressor combustor array 20. As the orientation of the compressor combustor array 20 changes, i.e. the array rotates, each control rod 84 is alternatingly pulled and pushed to adjust the fuel delivery rate of at least one control valve.

Hence a swashplate 20 may be utilised to mechanically link the orientation of the compressor combustor array 20 relative to the rotational axis to the configuration of the control valves in order to apportion fuel between lines 76 through control valves. In a further example, the swashplate 80 may be provided as a virtual swashplate. That is to say there may be provided an electronically operated regulation system wherein the relationship between relative fuel flows governed by the virtual swashplate is substantially identical to that produced by a physical swashplate, but an electronic control system is operable to adjust the control valves.

Figure 9:
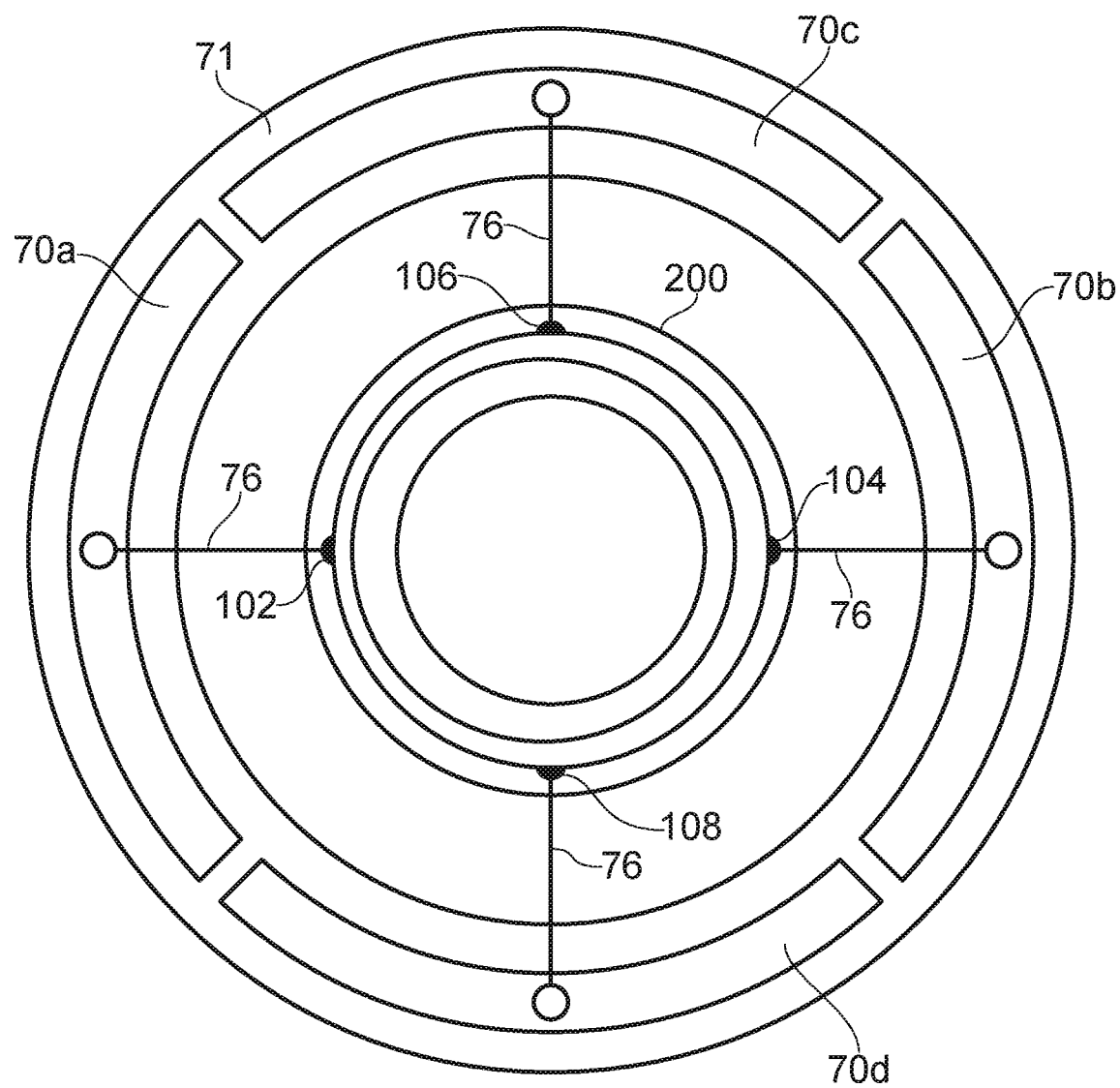
FIGS. 9, 10, 11 show sectional views of an example of a flow regulator provided as part of the combustion engine of FIGS. 2 to 4.
Figure 10:
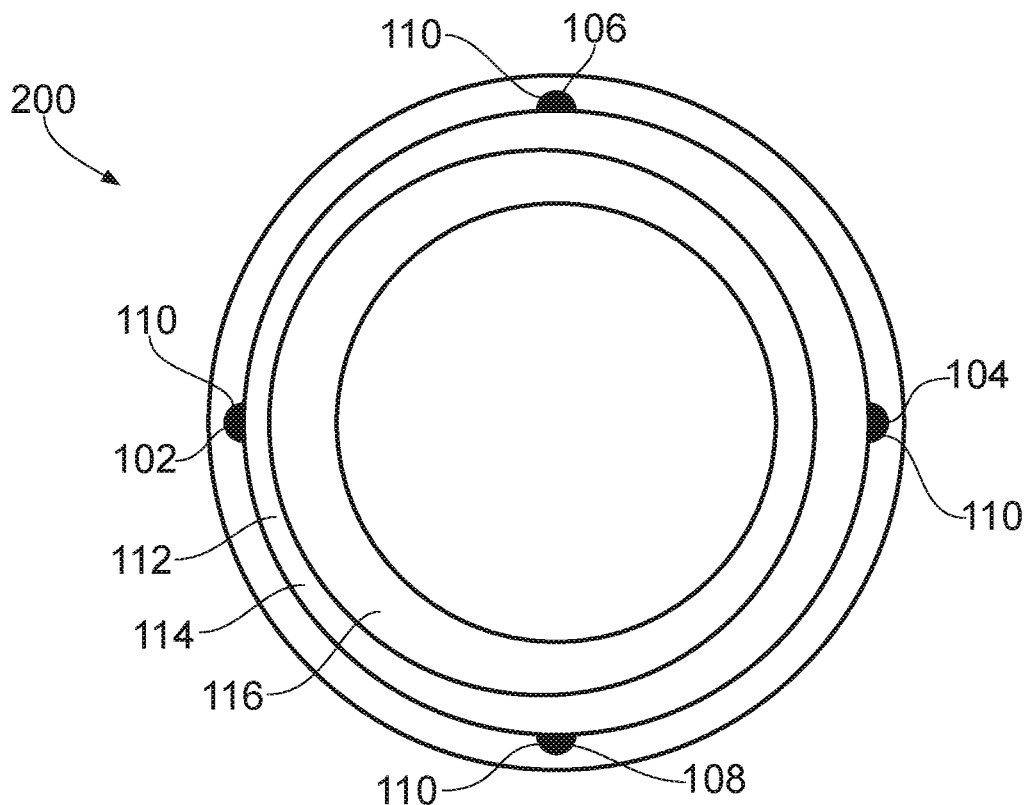
Figure 11:
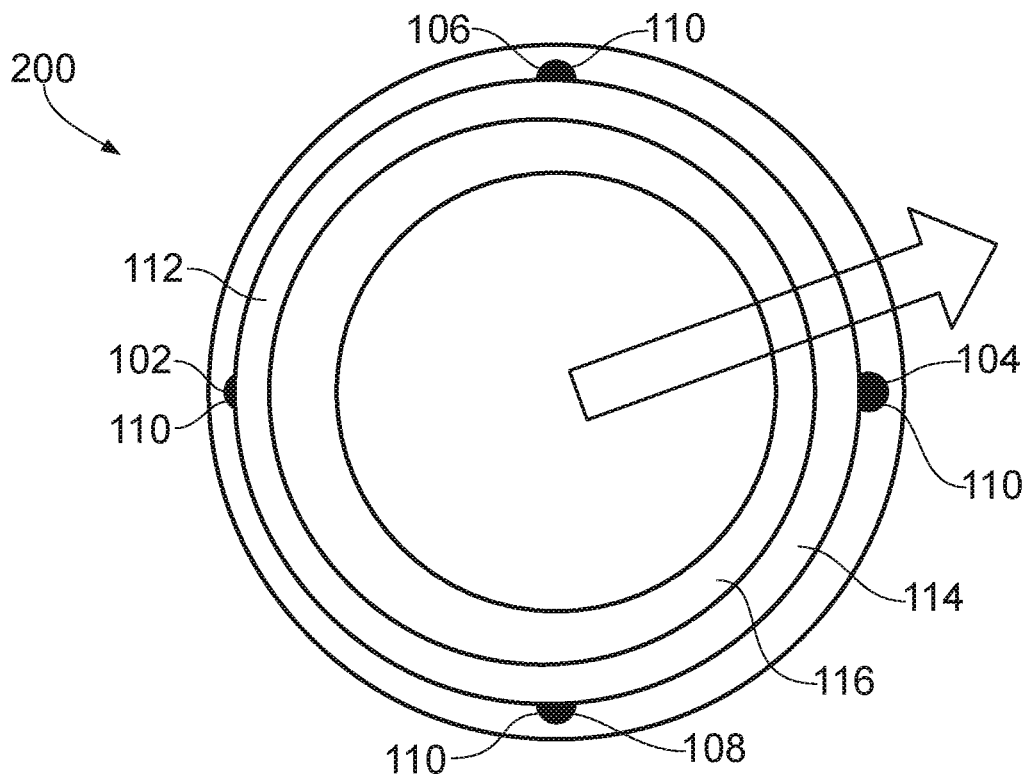

Alternatively, as shown in FIGS. 9, 10, 11, the flow control valves 102, 104, 106, 108 are each provided as an aperture 110 opened and closed by a common restrictor plate 112. The restrictor plate 112 comprises a first cam plate 114 provided around, and rotatable relative to, a second cam plate 116. The first cam plate 114 and second cam plate 116 are concentrically rotatably mounted and the flow regulator 200 comprises an actuator (not shown) coupled to the first cam plate 114 and second cam plate 116 so that the first cam plate 114 and second cam plate 116 are independently rotatable relative to one another to thereby move the restrictor plate 112 relative to each of the valve apertures 110. Hence movement of the restrictor plate 112 adjusts the each control valve 102, 104, 106, 108 to a different extent thereby operable to control fuel flow delivery rate to each of the fuel reservoirs 70.

In FIG. 10, the first cam plate 114 and second cam plate 116 are in a first relative position relative to one another, which results in each of the apertures 110 being restricted to a first extent, where each of the apertures 110 may be restricted by the same or different amount to another of the apertures 110.

In FIG. 11 the first cam plate 114 and second cam plate 116 have been rotated relative to one another such that they are in a different relative position to that shown in FIG. 10, and hence at least some of the apertures 110 are restricted by a different amount to that shown in FIG. 10.

FIGS. 9, 10, 11 show the cam plate flow regulator 200 used in connection with the ring 71 of FIG. 6. However it will be appreciated that it could equally well be adapted for use with the ring 71 of FIGS. 5, 7.

Figure 12:
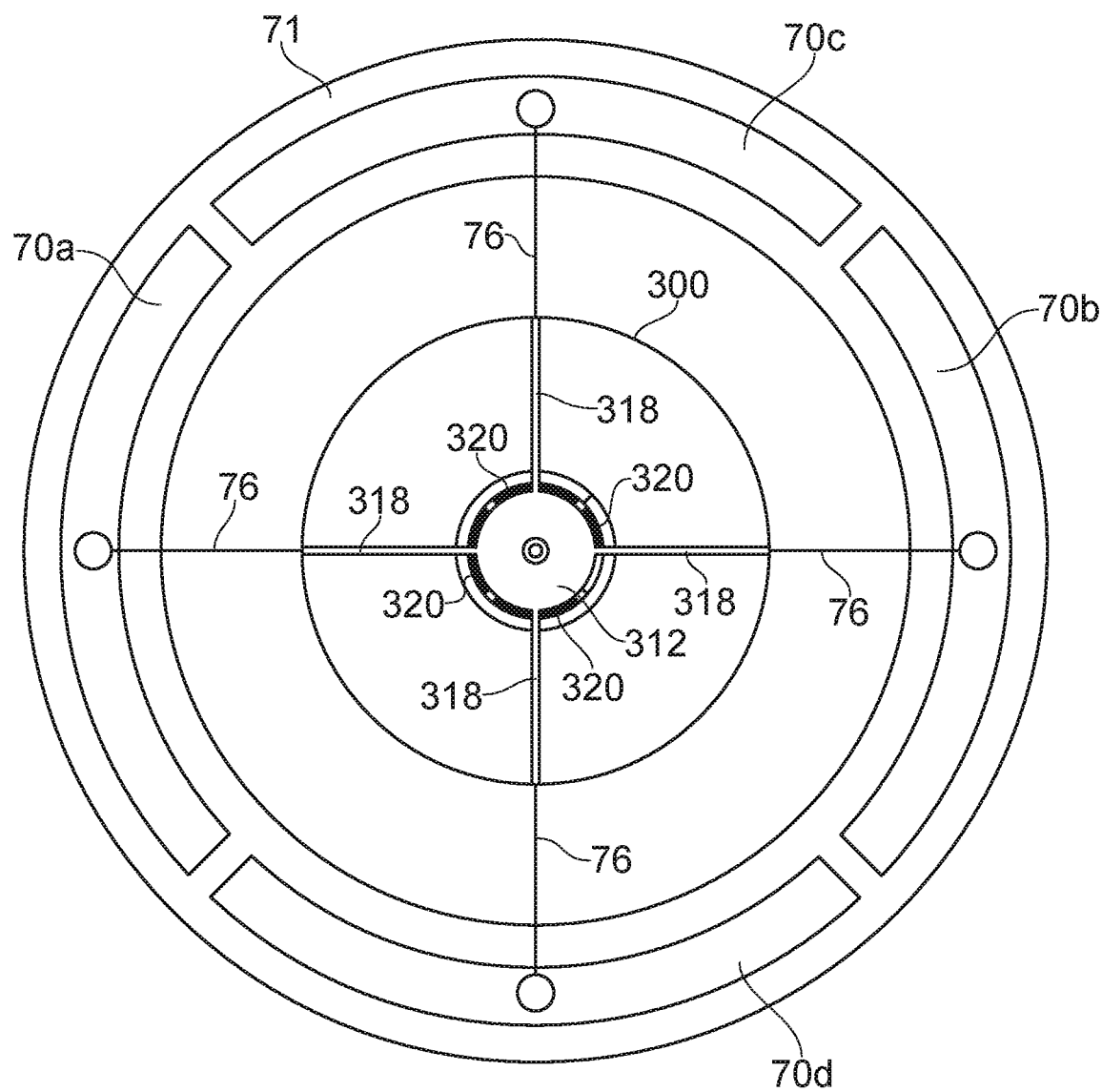
FIGS. 12, 13, 14 show a further example of a flow regulator provided as part of the combustion engine of FIGS. 2 to 4.
Figure 13:
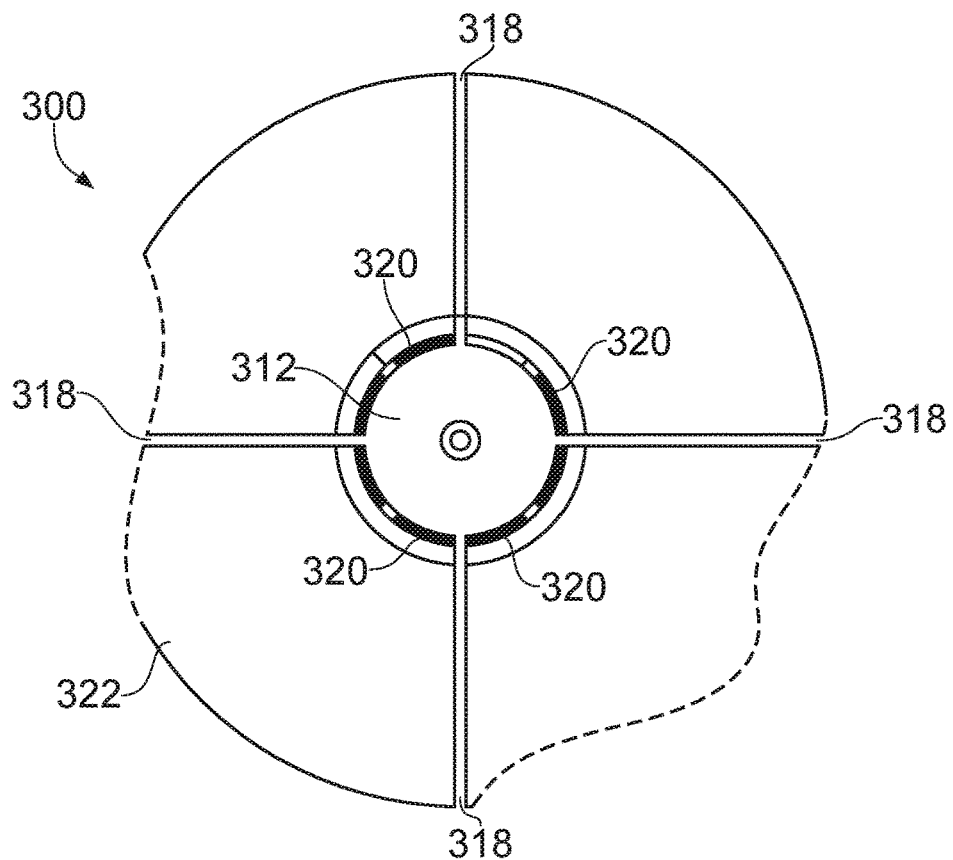
Figure 14:
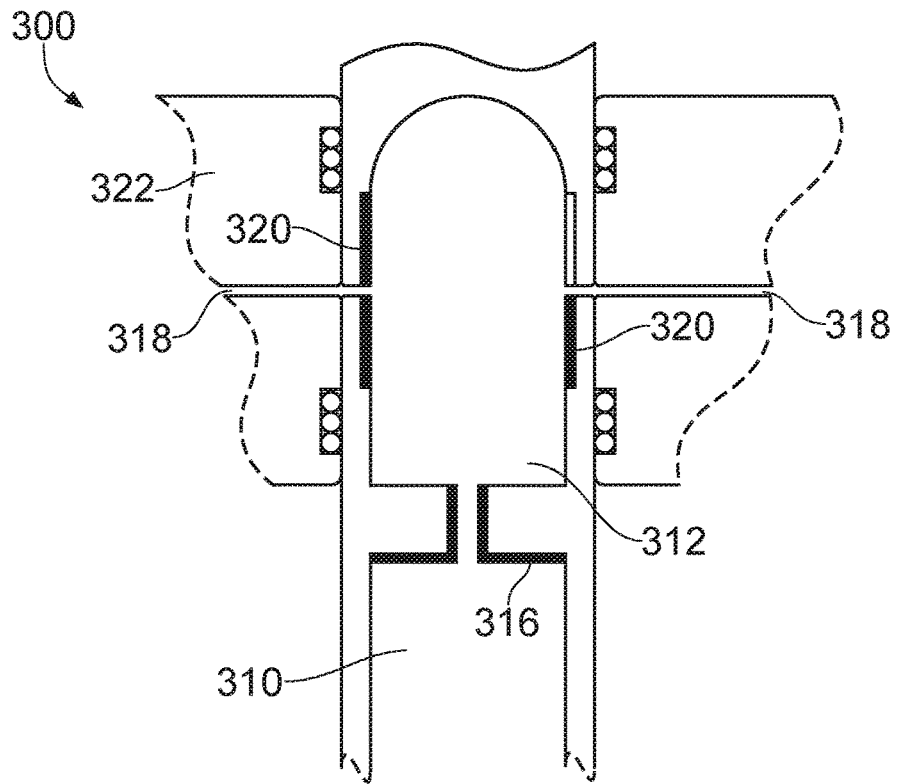

Alternatively, as shown in FIGS. 12, 13, 14 the flow regulator 300 may comprise electrostatic means to regulate fuel flow to the flow reservoirs 70. FIG. 12 shows a view of the electrostatic flow regulator 300 used in connection with the ring 71 of FIG. 6. However it will be appreciated that it could equally well be adapted for use with the ring 71 of FIGS. 5, 7. FIG. 13 shows an enlarged view of the electrostatic flow regulator 300 shown in FIG. 12. FIG. 14 shows a side sectional view of the electrostatic flow regulator 300.

The flow regulator 300 comprises a fuel vaporiser 310 in flow communication with a fuel vapour chamber 312 via a first electrode 316 (e.g. an anode) operable to provide a charge of a first polarity to fuel vapour passing there through each of the fuel reservoirs 70a, 70b in flow communication with the fuel vapour chamber 312 via respective flow ports 318 which extend from (and are evenly spaced around) the fuel vapour chamber 312. The flow ports 318 are each provided in a respective second electrode plate 320 (e.g. cathode) which extends around each port 318. Each of the second electrode plates 320 is operable to provide a charge of a second polarity opposite to the first polarity. Each of the second electrode plates is operable to be controlled independently to bias the flow to fuel vapour through their respective ports 318.

The vaporiser 310 is non rotatable and is surrounded by a directly abutting housing 322 through which ports 318 extend to link to fuel lines 76. Bearings are provided between the housing 322 and vaporiser 310 to allow the housing 322 to rotate relative to the vaporiser 310. By varying the electric potential of individual electrodes (e.g. a cathode) with respect to another electrode (i.e. an anode), the flow of fluid vapour in vapour chamber 312 may be biased to favour a particular port 318 and thereby the mass of vapour entering a particular fuel line 76, and hence a particular fuel reservoir 70.

In a further example, instead of the first electrode (anode) an electrostatic accumulation is achieved by driving fluid vapour down insulating piping (not shown). Charged fuel vapour entering vapour chamber 312 can be further directed via electric force fields across the chamber. In such an example the electrodes 320 may be provided as paired anodes and cathodes arranged opposite each other around the circumference of the vapour chamber 312. FIGS. 12, 13 illustrates four electrodes. In another example a single pair or multiple electrodes may be provided instead.

In operation, a starter motor or such like (not shown) will rotate the radial compressor 16, and hence the compressor-combustor 20, to thereby draw air into the inlet 52 in the direction shown by arrow "B" in FIG. 2. The radial compressor 16 compresses the air as it flows radially outwards to the flow turning vanes 22 (where present) where the air is turned to have a favourable angle of incidence for entry into the compressor flow path chambers 30 and the pilot combustion zone chambers 28.

Air entering compressor flow path chambers 30 is compressed by the action of rotation of the compressor-combustor array 20. That is to say, as the air in the chambers 30, it is compressed and forced to move radially outwards and is delivered to the outlets 38 and then to the main combustor 60.

In examples where the flow path chambers 30 have substantially parallel or diverging walls, the air in the chambers 30 is merely forced to move radially outwards with little or no rise in pressure before being delivered to the outlets 38 and then to the main combustor 60.

At the same time air is passed into the inlet 32 of the pilot combustion zone chambers 28, and fuel is added from the fuel injector 40.

The fuel air mix is initially ignited by an igniter, perhaps of conventional design located in the combustion zone chamber 28 or main combustor 60. After initial ignition, the combustion in the combustor pilot combustion zone 28 and main combustor 30 is self-perpetuating.

Figure 1:
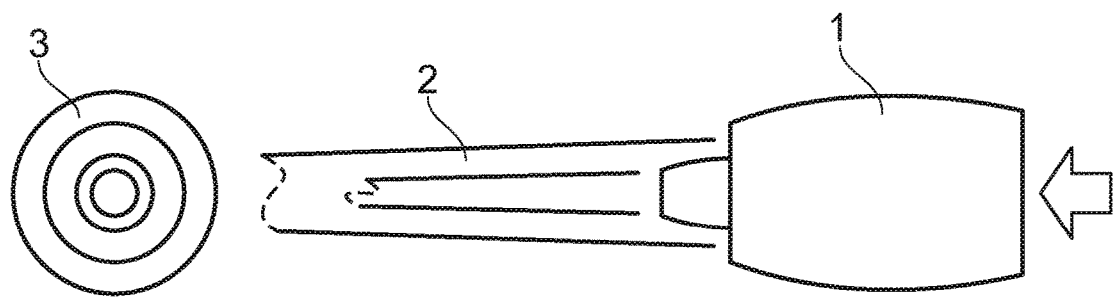
FIG. 1 shows a side view of a conventional gas turbine jet engine in operation, as previously discussed.

Air flowing along the flow paths 30 will cool the walls of the chambers 28 and mix with the unburned and burning fuel entering the main combustor to complete the combustion process. The compressor-combustor array 20 is propelled around the shaft 40 in response to the expanded and accelerated gas exiting the pilot combustion zones 28. That is to say, the gas leaving the pilot combustion zone 28 has been sufficiently expanded and accelerated by the combustion process to impart a thrust upon the vanes 26 and thus turn the compressor-combustor 20 around the central axis 12. As the compressor-combustor 20 is in a geared relationship with the compressor 16, the rotation of the compressor-combustor 20 will rotate the compressor 16. Hence the compressor 16 is powered to draw in fluid through the inlet 52 in the direction shown by arrow B in FIG. 1, and the air being drawn in will be compressed and the cycle of compression and combustion will be repeated and perpetuated.

Fuel combustion, i.e. complete combustion, will occur in the main combustor 60. Hence the fuel and air will be accelerated further as they expand and exit from the main combustor 62 through the duct(s) 64. This may be used to provide thrust, or to drive a turbine to provide a power off-take as required.

In one mode of operation the flow regulator 100, 200, 300 in combination with the fuel flow reservoir 70 of any example of the present disclosure may provide an equal amount of fuel to each of the fuel injectors 40.

Figure 4:
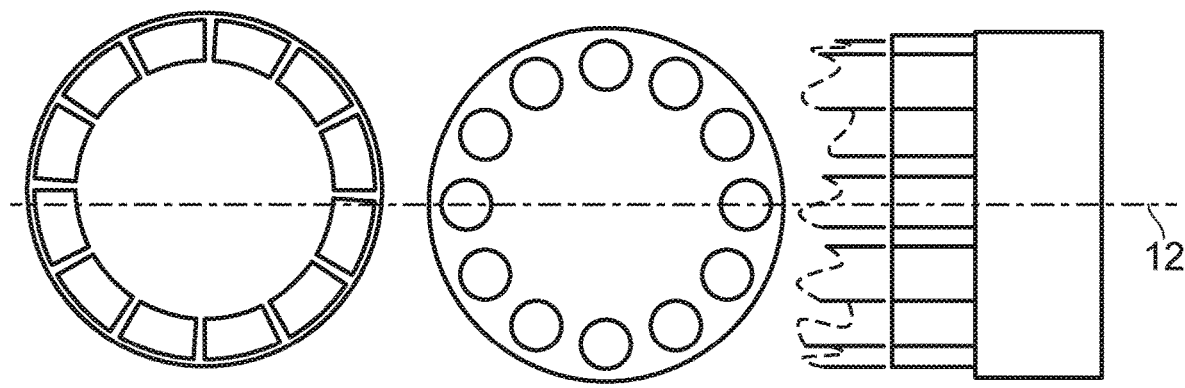
FIG. 4 shows a representation of the combustion engine of FIGS. 2, 3 in operation.

Additionally, as described above, the flow regulator 100, 200, 300 in combination with the fuel flow reservoirs 70 of any example of the present disclosure is also operable to bias fuel flow to one or more fuel injectors 40 in preference to one or more of the other fuel injectors 40. Hence apparatus of the present disclosure provides differential fuel delivery to fuel injectors 40 such that any one injector 40 or group of fuel injectors 40 may receive a different mass of fuel per unit time with respect to one another. This difference is consistently definable at any point in their 360 degree rotation. By such means, if the generated thrust of the engine be considered from the periphery of a circle divided into two or more sectors, as shown in FIG. 4, then a consistent differential of thrust may obtain such that the overall engine thrust is defected/vectored in a consistent manner non parallel with the axis of the engine. Equal output from all sectors determining the net vector of thrust to be axial.

Regulatory valves may be located at any point out from the fuel source on fuel lines 76 up to and including the fuel delivery conduits 72. Power to operate valves directly, by a stepping motor or otherwise, within a 360 degree cycle, may be hard wired. Alternatively separate switch gear to regulate their operation, via stepper motors or otherwise, in groups or individually may be hard wired.

Alternatively the valves may be hard wired through 360 degrees with a coded signal to regulate them through 360 degrees, via a stepping motor or otherwise, carried over the power supply to operate them.

Alternatively the valves may be hard wire powered but their operation controlled by static non-contact electromagnetic or short range radio signals from at least one fixed transmitter adjacent to their circle of rotation.

Alternatively the valves may generate their own power directly by electric induction from surrounding fixed or electro magnets. They may be operated within a 360 degree cycle by hard wiring.

Alternatively valves powered by electric induction, but controlled by static non-contact electromagnetic or short range radio signals from at least one fixed transmitter adjacent to their circle of rotation within their 360 degree cycle.

Alternatively valves may be subject to field force internal deflection from their neutral state such that fuel flow is regulated during a 360 degree cycle. Their static position may be displaced by at least one controllable magnetic or electromagnetic located device adjacent to their 360 degree circle of rotation.

Hence there is provided a combustion engine capable of producing sufficient thrust and/or power output to power a land, water or air vehicle. The configuration of the device of the present disclosure lends itself to being provided at a lower cost, and to fit within a smaller volume, than an equivalent conventional combustion engine. The absence of a separate turbine, which is normally common in a gas turbine engine, allows for a more compact design, with fewer moving parts.

Also jet thrust vectoring by varying fuel flow by engine sector may be achieved. This may be used for stabilisation of a vehicle with an engine of the present disclosure in a hover mode or controlling direction of flight.

It is especially advantageous as components which are used to cause the vectored thrust relate to fuel control rather than flow direction nozzles of the related art, and hence are smaller, lighter, cheaper and easier to produce and maintain than components (e.g. nozzles) required to achieve vectored thrust in examples of the related art.

The combustion engine of the present disclosure is especially advantageous as components which are used to cause the vectored thrust are internal to the engine, and hence place no demand on the external geometry of the combustion engine, and thus (unlike variable nozzles of examples of the related art) has no effect on aerodynamic drag of the engine.

The design and fluid flows within the engine determine a circumferential distribution of the nozzles. The engine is thereby relatively short in its axis and wide in the axial plane. Thus, for the same cumulative outflow from the engine, any variation in thrust around the central axis will have a greater torsional effect on net thrust.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A combustion engine comprising:
a first fuel reservoir;
a second fuel reservoir;
a flow regulator;
a compressor-combustor array and a radial compressor, the compressor-combustor array is provided radially outward of the radial compressor;
both the radial compressor and compressor-combustor array being co-axial with, and rotatable around, a central axis;
wherein the compressor-combustor array comprises an array of rotor blades comprising walls;
wherein the walls of the blades define a plurality of chambers with the plurality of chambers comprising:
a first pilot combustion chamber; and
a second pilot combustion chamber; and
at least one of the plurality of chambers being provided as a compression flow path chamber;
wherein the first pilot combustion chamber is provided with a first fuel injector, and the second pilot combustion chamber is provided with a second fuel injector;
wherein the first fuel injector is in flow communication with the first fuel reservoir;
wherein the second fuel injector is in flow communication with the second fuel reservoir;
wherein the first fuel reservoir and the second fuel reservoir are each in fluid communication with the flow regulator;
wherein the flow regulator is operable to vary fuel flow delivery rate to the first fuel reservoir and the second reservoir relative to each other.

2. The combustion engine as claimed in claim 1 wherein:
the plurality of chambers comprises additional pilot combustion chambers;
at least one of the additional pilot combustion chambers being in flow communication with the first fuel reservoir; and
at least a different one of the additional pilot combustion chambers being in flow communication with the second fuel reservoir.

3. The combustion engine as claimed in claim 1 wherein the flow regulator comprises:

a first flow control valve in flow communication with the first fluid reservoir; and a second flow control valve in flow communication with the second fluid reservoir;

wherein the first flow control valve and the second flow control valve are operable to regulate fuel flow independently of one another.

4. The combustion engine as claimed in claim 1 wherein:

the combustion engine comprises additional fuel reservoirs;

the plurality of chambers comprises additional pilot combustion chambers with each of the pilot combustion chambers being in flow communication with only one fuel reservoir;

wherein each of the fuel reservoirs is in fluid communication with the flow regulator.

5. The combustion engine as claimed in claim 3 wherein:

the flow regulator comprises a plurality of flow control valves;

each of the fuel reservoirs is in fluid communication with a different one of the flow control valves;

wherein each of the flow control valves is operable to regulate fuel flow independently of one another.

6. The combustion engine as claimed in claim 1 wherein each of the fluid reservoirs is coupled to, and rotatable with, its respective pilot combustion chamber around the central axis.

7. The combustion engine as claimed in claim 1 wherein:

the pilot combustion chambers are divided into groups extending around sectors of the compressor-combustor array;

the fuel injectors of each of the groups of pilot combustion chambers being in flow communication with a different one of the fluid reservoirs.

8. The combustion engine as claimed in claim 2 wherein the pilot combustion chambers are divided into:

a first group extending around a first sector of the compressor-combustor array and a second group extending around a second sector of the compressor-combustor array;

the first fluid reservoir is in flow communication only with the ones of the fuel injectors of the plurality of chambers in the first group;

the second fluid reservoir is in flow communication only with the ones of the fuel injectors of the plurality of chambers in the second group.

9. The combustion engine as claimed in claim 8 wherein the first sector and the second sector extend around different halves of the compressor-combustor array.

10. The combustion engine as claimed in claim 3 wherein the first flow control valve and second flow control valve are operable to regulate fuel flow independently of one another in response to a signal from a control system.

11. The combustion engine as claimed in claim 3 wherein the flow regulator comprises an actuator, and each of the flow control valves is operable to be open and closed by the actuator.

12. The combustion engine as claimed in claim 11 wherein the actuator comprises control rods which extend from a swash plate, with each of the control valves coupled to a different control rod such that movement of the swash plate adjusts the each control valve to a different extent thereby operable to control fuel flow delivery rate to each of the fuel reservoirs.

13. The combustion engine as claimed in claim 3 wherein the flow control valves are each provided as an aperture openable and closable by a common restrictor plate and wherein the restrictor plate comprises:

a first cam plate provided around, and rotatable relative to, a second cam plate;

the first cam plate and the second cam plate concentrically rotatably mounted; and the flow regulator comprises an actuator coupled to the first cam plate and the second cam plate so that the first cam plate and the second cam plate are independently rotatable to thereby move the restrictor plate relative to each of the valve apertures such that movement of the restrictor plate adjusts each of the control valves to a different extent and is thereby operable to control fuel flow delivery rate to each of the fuel reservoirs.

14. The combustion engine as claimed in claim 1 wherein the flow regulator comprises:

a fuel vaporiser which is in flow communication with a fuel vapour chamber via a first electrode operable to provide a charge of a first polarity to fuel vapour passing there through;

each of the fuel reservoirs being in flow communication with the fuel vapour chamber via respective flow ports which extend from the fuel vapour chamber;

the flow ports each being provided in a respective second electrode plate which extends around each port;

each of the second electrode plates operable to provide a charge of a second polarity opposite to the first polarity;

each of the second electrode plates operable to be controlled independently to bias the flow to fuel vapour through their respective ports.

15. The combustion engine as claimed in claim 1 further comprising a main combustion chamber provided radially outwards of the compressor-combustor array and in flow communication with the plurality of chambers, wherein the main combustion chamber comprises a plurality of outlets that each are in flow communication with a plurality of exhaust ducts.

* * * * *